United States Patent Office 2,750,391
Patented June 12, 1956

2,750,391

SEPARATION OF NICOTINAMIDE FROM ITS ISOMERS

Godfrey Wilbert, Carmel, N. Y., assignor to Nepera Chemical Co., Inc., Nepera Park, Yonkers, N. Y., a corporation of New York No Drawing. Application February 19, 1953,
Serial No. 337,879

10 Claims. (Cl. 260—295.5)

This invention relates to the separation of isomeric compounds and relates more particularly to an efficient and economical process for the separation of nicotinamide from a mixture of isomeric pyridine carboxylic acid amides.

An object of this invention is the provision of a novel process for the treatment of mixtures containing nicotinamide, picolinamide and isonicotinamide whereby the nicotinamide contained therein may be recovered.

Another object of this invention is to provide a means for separating nicotinamide from a mixture of pyridine carboxylic acid amides whereby a high proportion of the nicotinamide present may be recovered efficiently and in a high degree of purity.

Other objects of this invention will appear from the following detailed description.

Nicotinamide is a component of the vitamin B group and is known to be the anti-pellagra vitamin. This compound may be obtained, for example, by the oxidation of nicotine to nicotinic acid followed by amidation of the acid, or by the treatment of beta-pyridine carboxylic acid with thionyl-chloride followed by reaction of the acid chloride formed with ammonia. The sulfonation of pyridine to yield beta-pyridine sulfonic acid, followed by replacement of the sulfonic acid group with a cyano group and the hydrolysis of the cyano group also is a useful method of synthesizing nicotinamide. The sulfonation of pyridine, however, not only yields the desired beta-isomer but small amounts of both the alpha- and gamma-isomers are also formed. Consequently, the final product which is obtained after hydrolysis of the corresponding cyano compounds, comprises a mixture of nicotinamide containing some picolinamide and isonicotinamide. The latter two isomers must be removed in order to obtain a product of the desired purity. Fractional crystallization of the mixture enables the major proportion of nicotinamide to be separated. The mixture remaining after the fractional crystallization is a low melting mixture of the three isomeric pyridine carboxylic acid amides which cannot be separated economically by the usual procedures. Distillation is not practical as a means of separation since the boiling points are close.

I have now found that nicotinamide may be separated from a mixture of nicotinamide, picolinamide and isonicotinamide very effectively and economically by dissolving the mixture of amides in water together with a sufficient amount of oxalic acid to form the corresponding oxalate salts of said amides, and then cooling the resulting aqueous solution of amide oxalate salts which is obtained. Since the oxalic acid salt of nicotinamide is far less soluble in cold water than the oxalic acid salts of both picolinamide and isonicotinamide, a preferential precipitation of the nicotinamide oxalate takes place on cooling the aqueous solution of isomeric amide oxalates. The nicotinamide oxalate is filtered off upon precipitation and, after the recrystallization of this compound from water, nicotinamide oxalate is obtained in a high degree of purity. The nicotinamide may be recovered from its oxalate salt form by neutralizing a methanol solution of the salt with ammonia, which results in ammonium oxalate being precipitated, and, after filtering off the ammonium oxalate, evaporating the filtrate until the nicotinamide present crystallizes out. Secondary crops of crystals of nicotinamide may also be recovered from the methanol filtrate by further evaporation and recrystallization. The nicotinamide which is recovered from the mixture in accordance with my novel procedure passes all specifications. From about 66% to 77% of the nicotinamide present in the mixture of isomeric pyridine carboxylic acid amides treated may be readily recovered in accordance with my process.

In forming the oxalate salts of said isomeric pyridine carboxylic acid amides, from 1 to 1.1 mols of oxalic acid may be employed for each mol of amide present in the mixture. Optimum results are obtained, however, when the oxalic acid is employed in a mol to mol ratio to the amides rather than in the equivalent weight of acid. The amount of water which may be utilized in forming the aqueous solution of the oxalate salts of the pyridine carboxylic acid amides may also be varied. The aqueous solution should not be excessively dilute so that unnecessarily large quantities of water must be evaporated off before a fractional precipitation of the nicotinamide oxalate can take place. Preferably, the aqueous solution to which the oxalic acid is added should contain from 8.5 to 10.5% by weight of the isomeric pyridine carboxylic acid amides.

In carrying out my novel process, it is preferable to heat the aqueous solution formed to ensure that reaction between the oxalic acid and the isomeric pyridine carboxylic acid amides has taken place and that complete solution of the resulting amide oxalate salts has been effected. Usually, heating the solution to a temperature of 78 to 85° C., say about 80° C., is sufficient. Agitation of the mixture also enables the oxalate salt to go into solution more rapidly.

Care must be taken to cool the hot aqueous solution of pyridine carboxylic acid amide oxalates uniformly and to approach the temperature at which the preferential precipitation of the nicotinamide oxalate takes place gradually, so as to avoid precipitation of the other isomers which are present. Thus, for example, by cooling the aqueous solution to within a temperature of 50 to 55° C. and then slowly cooling it to a temperature of 15 to 20° C., e. g. about 19° C., a suitable separation may be effected without precipitating the alpha- and gamma-isomers.

The nicotinamide oxalate precipitate is filtered off, dissolved in water, the solution heated and, upon cooling the solution, the nicotinamide oxalate may then be recrystallized in a more highly purified form. After filtration, washing and drying, the recrystallized nicotinamide oxalate may be suspended in methanol and the nicotinamide then liberated from the oxalate salt form by passing ammonia through the solution while maintaining it at a temperature of from about 30 to 35° C. When a pH of 8–9 is reached, the mixture is warmed to about 40 to 45° C., the ammonium oxalate precipitate which is present is removed by filtration and the filter cake washed with methanol.

The nicotinamide remains in the filtrate and may be recovered by evaporating the filtrate until the nicotinamide crystallizes out. The recovered nicotinamide melts at 128–130° C. The recovered ammonium oxalate may be employed to form the amide oxalate by reacting it with the mixture of isomeric pyridine carboxylic acid amides in aqueous solution.

In order further to illustrate my invention but without being limited thereto, the following examples are given:

*Example I*

146.56 parts by weight of a mixture of nicotinamide, picolinamide and isonicotinamide, containing about 60%, 25% and 15% of said compounds, respectively and melting at 114.5–116° C., is added to 1400 parts by weight of water together with 151.28 parts by weight of technical oxalic acid. The solution formed is heated to 80° C. with agitation. Upon cooling the solution to about 19° C. with good agitation, a precipitate of nicotinamide oxalate is formed. The precipitate is filtered and is then washed with a small amount of cold water. Recrystallization is carried out by adding the washed filter cake to 1500 parts by weight of water, after which the resulting solution is heated to 70° C., cooling to 15° C. with agitation and the nicotinamide oxalate precipitated is filtered off, washed and dried.

The dried nicotinamide oxalate is then suspended in about 200 parts by weight of anhydrous methanol and gaseous ammonia passed through the suspension while maintaining the temperature at 30–35° C. When a pH of 8–9 is reached, the mixture is warmed to 40° C. The precipitate of ammonium oxalate which has formed is then filtered off and washed with about 25 parts by weight of methanol. The methanol filtrate and wash liquor are combined, treated with decolorizing charcoal and the volume reduced by evaporation. After the volume of the solution has been reduced to about six-tenths of the initial volume, it is cooled to about 20° C. and the major part of the nicotinamide in solution then crystallizes out. The precipitated nicotinamide is filtered off and, after the filtrate is subjected to further evaporation and crystallization, a second and third crop of nicotinamide is obtained. The total recovery of nicotinamide based on that originally present is approximately 71% of theory. The nicotinamide recovered melts at 128.3 to 130.0° C. and passes all U. S. P. specifications as to color, etc.

*Example II*

In lieu of forming the amide oxalate directly by reacting the isomeric amides with oxalic acid, the amide oxalate may also be formed by reacting the mixture of isomeric amides with ammonium oxalate in aqueous solution. Acidification of the aqueous solution obtained to a pH of about 2 with aqueous sulfuric acid, followed by heating to about 90° C. and then cooling to about 19° C., permits the nicotinamide oxalate thus formed to precipitate. The latter may then be converted to free nicotinamide, as described in Example I. This novel modification permits the utilization of the oxalic acid for a dual purpose, initially as the free oxalic acid itself and secondarily as ammonium oxalate. The ammonium sulfate formed during my novel process is also a valuable by-product.

It is understood that the foregoing detailed description is given merely by way of illustration and that many variations may be made therein without departing from the spirit of my invention.

Having described my invention, what I desire to secure by Letters Patent is:

1. In a process for the separation of nicotinamide from a mixture of isomeric pyridine carboxylic acid amides, the steps which comprise converting said amides to the corresponding oxalate salts in an aqueous medium, separating nicotinamide oxalate from the remaining amide oxalates by fractionally precipitating said nicotinamide oxalate from an aqueous solution of said amide oxalates and regenerating free nicotinamide.

2. Process for the separation of the nicotinamide from a mixture of isomeric pyridine carboxylic acid amides, which comprises reacting said mixture of isomeric pyridine carboxylic acid amides in an aqueous medium with oxalic acid to form the oxalates of said pyridine carboxylic acid amides, fractionally precipitating nicotinamide oxalate from said aqueous medium and regenerating free nicotinamide.

3. Process for the separation of the nicotinamide from a mixture of isomeric pyridine carboxylic acid amides, which comprises reacting said mixture of isomeric pyridine carboxylic acid amides in an aqueous medium with about an equimolecular quantity of oxalic acid to form the oxalates of said pyridine carboxylic acid amides, fractionally precipitating nicotinamide oxalate from said aqueous medium and regenerating free nicotinamide.

4. Process for the separation of the nicotinamide from a mixture of isomeric pyridine carboxylic acid amides, which comprises reacting said mixture of isomeric pyridine carboxylic acid amides in an aqueous medium with about an equimolecular quantity of oxalic acid to form the oxalates of said pyridine carboxylic acid amides, heating said mixture to a temperature of 78 to 85° C., fractionally precipitating nicotinamide oxalate from said aqueous medium by cooling the same to a temperature of about 15 to 20° C. and regenerating free nicotinamide.

5. Process for the separation of nicotinamide from a mixture of isomeric pyridine carboxylic acid amides, which comprises reacting said mixture of isomeric pyridine carboxylic acid amides in an aqueous medium with ammonium oxalate whereby said amides are converted to the oxalate salts of said isomeric pyridine carboxylic acid amides, separating nicotinamide oxalate from the mixture of amide oxalates obtained and regenerating free nicotinamide.

6. Process for the separation of the nicotinamide from a mixture of isomeric pyridine carboxylic acid amides, which comprises reacting said mixture of isomeric pyridine carboxylic acid amides in an aqueous medium with oxalic acid to form the oxalates of said pyridine carboxylic acid amides, fractionally precipitating and separating nicotinamide oxalate from said aqueous medium, forming a suspension of said separated nicotinamide oxalate in a lower aliphatic alcohol, rendering said suspension alkaline with ammonia to precipitate ammonium oxalate and form a solution of nicotinamide in said alcohol, and evaporating the solution of nicotinamide to recover nicotinamide therefrom.

7. Process for the separation of the nicotinamide from a mixture of isomeric pyridine carboxylic acid amides, which comprises reacting said mixture of isomeric pyridine carboxylic acid amides in an aqueous medium with about an equimolecular quantity of oxalic acid to form the oxalates of said pyridine carboxylic acid amides, fractionally precipitating and separating nicotinamide oxalate from said aqueous medium, forming a suspension of said nicotinamide oxalate in methanol, rendering said suspension alkaline with ammonia to precipitate ammonium oxalate and form a solution of nicotinamide in methanol, and evaporating said solution to recover nicotinamide therefrom.

8. Process for the separation of the nicotinamide from a mixture of isomeric pyridine carboxylic acid amides, which comprises reacting said mixture of isomeric pyridine carboxylic acid amides in an aqueous medium with about an equimolecular quantity of oxalic acid to form the oxalates of said pyridine carboxylic acid amides, heating said mixture to a temperature of 78 to 85° C., forming an aqueous solution of said oxalates fractionally precipitating and separating nicotinamide oxalate from said aqueous solution by cooling the same to a temperature of about 15 to 20° C., forming a suspension of said nicotinamide oxalate in methanol, rendering said suspension alkaline with ammonia to precipitate ammonium oxalate and form a solution of nicotinamide in methanol, and evaporating said methanol solution to recover nicotinamide therefrom.

9. Process for the separation of nicotinamide from a mixture of isomeric pyridine carboxylic acid amides, which comprises reacting said mixture of isomeric pyridine carboxylic acid amides in an aqueous medium with about an equimolecular quantity of oxalic acid to form the oxalates of said pyridine carboxylic acid amides, fractionally precipitating and separating nicotinamide oxalate from said aqueous medium, forming a suspension of said separated nicotinamide oxalate in a lower aliphatic alcohol, rendering said suspension alkaline with ammonia to precipitate ammonium oxalate, separating the ammonium oxalate from the alcoholic solution of nicotinamide remaining, evaporating the alcoholic solution of nicotinamide to recover nicotinamide therefrom, adding the separated ammonium oxalate to an aqueous solution of isomeric pyridine carboxylic acid amides, acidifying the aqueous solution obtained, heating the acidified solution to form the oxalates of said pyridine carboxylic acid amides, and cooling said solution to fractionally precipitate nicotinamide oxalate therefrom.

10. Process for the separation of the nicotinamide from a mixture of isomeric pyridine carboxylic acid amides, which comprises reacting said mixture of isomeric pyridine carboxylic acid amides in an aqueous medium with about an equimolecular quantity of oxalic acid to form the oxalates of said pyridine carboxylic acid amides, heating the aqueous medium to a temperature of 78 to 85° C., fractionally precipitating and separating nicotinamide oxalate from said aqueous medium by cooling the same to a temperature of about 15 to 20° C., forming a suspension of said nicotinamide oxalate in methanol, rendering said suspension alkaline with ammonia to precipitate ammonium oxalate, separating the ammonium oxalate from the methanol solution of nicotinamide remaining, evaporating the methanol solution of nicotinamide to recover nicotinamide therefrom, adding the separated ammonium oxalate to a second aqueous solution of isomeric pyridine carboxylic acid amides, acidifying the aqueous solution obtained to a pH of about 2, heating the acidified solution to a temperature of about 90° C. and then cooling said solution to fractionally precipitate nicotinamide oxalate therefrom.

References Cited in the file of this patent

UNITED STATES PATENTS

| | | |
|---|---|---|
| 2,459,191 | Slagle et al. | Jan. 18, 1949 |
| 2,459,192 | Slagle et al. | Jan. 18, 1949 |
| 2,516,370 | Cracas | July 25, 1950 |
| 2,681,341 | Cronheim et al. | June 15, 1954 |

OTHER REFERENCES

Gatterman: "Org. Chem." (MacMillan), pp. 11–14 (1896).

Karrer: "Org. Chem." (Elsevier, 2nd Eng. ed.) pp. 98–99 (1946).